US008886442B2

(12) United States Patent
Kinoshita

(10) Patent No.: US 8,886,442 B2
(45) Date of Patent: Nov. 11, 2014

(54) WATER JET PROPULSION WATERCRAFT

(75) Inventor: Yoshimasa Kinoshita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1359 days.

(21) Appl. No.: 12/644,357

(22) Filed: Dec. 22, 2009

(65) Prior Publication Data

US 2010/0256893 A1 Oct. 7, 2010

(30) Foreign Application Priority Data

Apr. 6, 2009 (JP) ................................ 2009-091771

(51) Int. Cl.

| | |
|---|---|
| ***B60T 7/12*** | (2006.01) |
| ***F02D 41/02*** | (2006.01) |
| ***B63H 21/32*** | (2006.01) |
| ***F01N 13/12*** | (2010.01) |
| ***F02D 41/06*** | (2006.01) |
| ***F02N 19/00*** | (2010.01) |
| *B63H 11/08* | (2006.01) |
| *F02D 41/12* | (2006.01) |
| *F02M 69/04* | (2006.01) |

(52) U.S. Cl.

CPC .............. *F02D 41/021* (2013.01); *B63H 21/32* (2013.01); *F01N 13/12* (2013.01); *F02D 41/062* (2013.01); *F02N 19/00* (2013.01); *B63H 11/08* (2013.01); *F01N 2590/022* (2013.01); *F02D 41/123* (2013.01); *F02M 69/044* (2013.01)

USPC ........... 701/104; 123/179.3; 440/89 R; 440/1; 701/113

(58) Field of Classification Search

USPC .................. 123/179.1, 179.3, 179.16, 90.15, 123/345–347, 568.14; 701/103, 104, 108, 701/113; 440/88 A, 88 G, 85, 89 E, 89 R, 89 A

See application file for complete search history.

(56) References Cited

U.S. PATENT DOCUMENTS

| | | | | |
|---|---|---|---|---|
| 4,867,115 | A * | 9/1989 | Henein | 123/179.17 |
| 5,353,763 | A * | 10/1994 | Schatz | 123/403 |
| 5,724,929 | A | 3/1998 | Mikame et al. | |

(Continued)

FOREIGN PATENT DOCUMENTS

| | | |
|---|---|---|
| JP | 11-208591 A | 8/1999 |

OTHER PUBLICATIONS

Kinoshita; "Water Jet Propulsion Watercraft"; U.S. Appl. No. 12/664,313, filed Dec. 22, 2009.

*Primary Examiner* — Stephen K Cronin
*Assistant Examiner* — Joseph Dallo
(74) *Attorney, Agent, or Firm* — Keating & Bennett, LLP

(57) ABSTRACT

A water jet propulsion watercraft includes a hull, an engine, a jet propulsion device, a fuel injection apparatus, an exhaust channel, and an engine control unit. The engine includes a combustion chamber arranged to combust fuel therein, an exhaust port arranged to discharge exhaust gas, an exhaust valve arranged to open and close the exhaust port, an intake port arranged for flow of air and the fuel into the combustion chamber, and an intake valve arranged to open and close the intake port. The engine control unit is arranged to control the engine to deliver the exhaust gas, retained at the intake side relative to the exhaust port, to the exhaust channel side in a state where a fuel injection amount of the fuel injection apparatus is set lower than an ordinary fuel injection amount during a predetermined period when starting of the engine is performed.

9 Claims, 8 Drawing Sheets

(56) References Cited

U.S. PATENT DOCUMENTS

| | | | | |
|---|---|---|---|---|
| 5,809,973 | A * | 9/1998 | Iida et al. | 123/491 |
| 5,836,288 | A * | 11/1998 | Nakagawa | 123/491 |
| 6,341,584 | B1 * | 1/2002 | Itoyama et al. | 123/90.15 |
| 6,648,706 | B2 * | 11/2003 | Kanno | 440/84 |
| 6,725,832 | B2 * | 4/2004 | Yokoyama et al. | 123/396 |
| 6,880,521 | B2 * | 4/2005 | Maemura | 123/305 |
| 6,986,331 | B2 * | 1/2006 | Mizutani | 123/179.15 |
| 7,111,615 | B2 * | 9/2006 | Tanaka et al. | 123/491 |
| 7,159,572 | B2 * | 1/2007 | Mizutani | 123/491 |
| 7,273,027 | B2 * | 9/2007 | Mizutani | 123/179.16 |
| 7,275,510 | B2 * | 10/2007 | Mizutani | 123/179.4 |
| 7,295,912 | B2 * | 11/2007 | Yasui et al. | 701/103 |
| 7,469,180 | B2 * | 12/2008 | Yasui et al. | 701/105 |
| 7,561,957 | B1 * | 7/2009 | Santoso et al. | 701/113 |
| 7,610,897 | B2 * | 11/2009 | Rayl | 123/321 |
| 7,647,143 | B2 * | 1/2010 | Ito et al. | 701/21 |
| 7,664,594 | B2 * | 2/2010 | Kojima | 701/113 |
| 8,142,241 | B2 * | 3/2012 | Kinoshita | 440/1 |
| 8,221,173 | B2 * | 7/2012 | Kinoshita | 440/1 |
| 2006/0096565 | A1 * | 5/2006 | Hattori et al. | 123/179.5 |
| 2007/0113803 | A1 * | 5/2007 | Froloff et al. | 123/90.11 |
| 2008/0105230 | A1 * | 5/2008 | Kishibata et al. | 123/179.5 |
| 2009/0042463 | A1 * | 2/2009 | Kinoshita | 440/38 |
| 2009/0048763 | A1 * | 2/2009 | Nishikiori et al. | 701/103 |
| 2009/0271095 | A1 * | 10/2009 | Kojima | 701/113 |
| 2010/0235074 | A1 * | 9/2010 | Shinagawa et al. | 701/108 |
| 2011/0077840 | A1 * | 3/2011 | Nishigaki | 701/104 |

* cited by examiner

WATER JET PROPULSION WATERCRAFT

BACKGROUND OF THE INVENTION

1. Field of the Invention

The present invention relates to a water jet propulsion watercraft including a jet propulsion device driven by an engine, in particular, an internal combustion engine.

2. Description of the Related Art

A water jet propulsion watercraft according to one prior art is disclosed in Japanese Unexamined Patent Application Publication No. 11-208591. The water jet propulsion watercraft is a personal watercraft that obtains a propulsive force from a jet propulsion device driven by an internal combustion engine. The jet propulsion device is arranged to draw in water from around a hull, jet the water, and apply a reaction force obtained by the jetting to the hull.

The engine includes a combustion chamber in which fuel is combusted, an exhaust valve opening and closing an exhaust port, and an intake valve opening and closing an intake port. The exhaust gas exhausted from the combustion chamber passes through the exhaust port. Air that is made to flow into the combustion chamber passes through the intake port. An exhaust channel is connected to the exhaust port. The exhaust gas is discharged to an exterior of the hull through the exhaust channel.

In Japanese Unexamined Patent Application Publication No. 11-208591, it is described that an overlap period, in which the intake valve and the exhaust valve are opened simultaneously, is provided to increase exhaust pressure and increase engine output.

SUMMARY OF THE INVENTION

The inventor of preferred embodiments of the present invention described and claimed in the present application conducted an extensive study and research regarding a water jet propulsion watercraft, such as the one described above, and in doing so, discovered and first recognized new unique challenges and problems as described in greater detail below.

That is, when the engine stops during the overlap period, a state in which communication is made from the intake side to the exhaust side (exhaust channel) is entered. In this case, for example, when there are waves on the water surface on which the water jet propulsion watercraft floats, the exhaust channel may become clogged with water and exhaust gas remaining inside the exhaust channel may be forced by water toward the combustion chamber and the intake side. It may thus be difficult to ignite the fuel when the engine is restarted. Consequently, it may not be possible to restart the engine smoothly.

In order to overcome the previously unrecognized and unsolved problems described above, a preferred embodiment of the present invention provides a water jet propulsion watercraft that includes a hull, an engine, a jet propulsion device, a fuel injection apparatus, an exhaust channel, and an engine control unit. The engine is installed in the hull. The engine includes a combustion chamber arranged to combust fuel therein, an exhaust port arranged to discharge exhaust gas after the combustion of the fuel in the combustion chamber, an exhaust valve arranged to open and close the exhaust port, an intake port arranged for air and the fuel to flow into the combustion chamber therethrough, and an intake valve arranged to open and close the intake port. When the engine is in operation, an overlap period occurs. In the overlap period, the exhaust port and the intake port are opened simultaneously. The jet propulsion device is arranged to be driven by the engine to draw in water from around the hull and then jet the water. The fuel injection apparatus is arranged to inject the fuel into the intake port. The exhaust channel is connected to the exhaust port and is arranged such that the exhaust gas discharged from the exhaust port flows therethrough. The engine control unit is arranged to control the engine to deliver the exhaust gas, retained at an intake side relative to the exhaust port (i.e., upstream of the exhaust port), to the exhaust channel side in a state where a fuel injection amount of the fuel injection apparatus is set lower than an ordinary fuel injection amount (for example, set to zero) during a predetermined period when starting of the engine is performed.

As described above, with the water jet propulsion watercraft according to the present preferred embodiment, when the starting of the engine is performed, the fuel injection amount of the fuel injection apparatus is set lower than the ordinary fuel injection amount (for example, set to zero) during the predetermined period. In this state, the engine control unit controls the engine to deliver the exhaust gas, retained at the intake side relative to the exhaust port, to the exhaust channel side. Thus, even in a case where the exhaust gas is retained at the intake side relative to the exhaust port when the engine is started, the retained exhaust gas can be delivered to the exhaust channel side. Gas concentrations of components that hinder combustion in the combustion chamber can thereby be lowered. The fuel injected from the fuel injection apparatus after the elapse of the predetermined period can thus be ignited reliably. Consequently, the engine can be started smoothly.

Preferably, the engine further includes a crankshaft arranged to be rotated by the engine, and a piston arranged to move up and down in the combustion chamber, and the engine control unit is arranged to perform drive control of moving the piston in the state where the fuel injection amount is set lower than the ordinary fuel injection amount during the predetermined period when the starting of the engine is performed. By this arrangement, the exhaust gas, retained in the combustion chamber, can be made to flow out of the combustion chamber when the piston is moved from a lower portion toward an upper portion of the combustion chamber.

Preferably, the engine further includes a starter motor arranged to rotate the crankshaft during starting, and the engine control unit is arranged to perform drive control of rotating the crankshaft by driving the starter motor in the state where the fuel injection amount of the fuel injection apparatus is set lower than the ordinary fuel injection amount during the predetermined period when the starting of the engine is performed. By this arrangement, the piston can be moved by rotating the crankshaft by the starter motor.

Preferably, the water jet propulsion watercraft further includes a detection unit arranged to detect whether or not the intake valve closes the intake port and whether or not the exhaust valve closes the exhaust port. Preferably in this case, the engine control unit is arranged to perform, under a condition that the detection unit detects an overlap state in which both the intake valve and the exhaust valve are stopped at positions of respectively opening the intake port and the exhaust port, a control of delivering exhaust gas, retained at an intake side relative to the exhaust port, to an exhaust channel side in the state where the fuel injection amount of the fuel injection apparatus is set lower than the ordinary fuel injection amount during the predetermined period when the starting of the engine is performed. In a case where at least one of the intake valve or the exhaust valve closes at least one of the intake port or the exhaust port, the exhaust gas does not flow in reverse from the exhaust channel and thus hardly any exhaust gas is retained at the intake side relative to the exhaust port. Thus, in this case, there is no need to perform an extra operation for moving air, etc., at the intake side relative to the exhaust port, to the exhaust channel side when the starting of the engine is performed.

Preferably, in a preferred embodiment of the present invention, the engine further includes a first actuator arranged to cause the intake valve to move to an open position of opening the intake port and a closed position of closing the intake port, and a second actuator arranged to cause the exhaust valve to move to an open position of opening the exhaust port and a closed position of closing the exhaust port. Here, when the starting of the engine is performed, the engine control unit is arranged to perform drive control of the first actuator and the second actuator at predetermined timings regardless of a stroke of the engine such that in the predetermined period, the intake valve is moved to the open position and the exhaust valve is moved to the closed position in a period in which the piston expands the combustion chamber, and the intake valve is moved to the closed position and the exhaust valve is moved to the open position in a period in which the piston compresses the combustion chamber. By this arrangement, the intake valve and the exhaust valve can be moved by the first actuator and the second actuator regardless of the stroke of the engine. The exhaust gas, retained at the intake side relative to the exhaust port, can thereby be delivered efficiently to the exhaust channel side.

Preferably, the first actuator and the second actuator include a first solenoid valve and a second solenoid valve, respectively. By this arrangement, the intake valve and the exhaust valve can be moved rapidly by the first solenoid valve and the second solenoid valve, respectively.

Preferably, the water jet propulsion watercraft further includes a detection unit arranged to detect whether or not the intake valve closes the intake port and whether or not the exhaust valve closes the exhaust port. Preferably, the engine control unit is arranged to perform, under a condition that the detection unit detects an overlap state in which both the intake valve and the exhaust valve are stopped at positions of respectively opening the intake port and the exhaust port, the drive control of the first actuator and the second actuator at the predetermined timings in the predetermined period when the starting of the engine is performed. In the case where at least one of the intake valve or the exhaust valve closes at least one of the intake port or the exhaust port, the exhaust gas does not flow in reverse from the exhaust channel and thus hardly any exhaust gas is retained at the intake side relative to the exhaust port. Thus, when the starting of the engine is performed, there is no need to perform the extra operation for moving the air, etc., at the intake side relative to the exhaust port, to the exhaust channel side.

Preferably, the engine control unit is arranged to perform a control of driving the engine by setting the fuel injection amount of the fuel injection apparatus to the ordinary injection amount after the elapse of the predetermined period. By this arrangement, the fuel can be injected in a state where hardly any exhaust gas is retained at the intake side relative to the exhaust port and the fuel can be ignited. The engine can thus be started smoothly.

Preferably, the predetermined period includes a period in which the crankshaft of the engine is driven for a predetermined time, or a period in which the crankshaft is rotated a predetermined number of times. By this arrangement, the exhaust gas, retained at the intake side relative to the exhaust port, can be delivered to the exhaust channel side reliably.

Preferably, the engine control unit is arranged to control the engine to block at least one location in a path leading from the exhaust channel to the intake port when driving of the engine is stopped. By this arrangement, even in a case where the exhaust channel becomes clogged with water and the exhaust gas remaining inside the exhaust channel is forced toward the combustion chamber and the intake side, the exhaust gas can be prevented from flowing to the intake side. Difficulty in igniting the fuel when restarting the engine can thus be minimized. Consequently, the engine can be restarted smoothly.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A structure of a water jet propulsion watercraft 1 according to a first preferred embodiment of the present invention will now be described with reference to FIG. 1 to FIG. 5.

Figure 1:
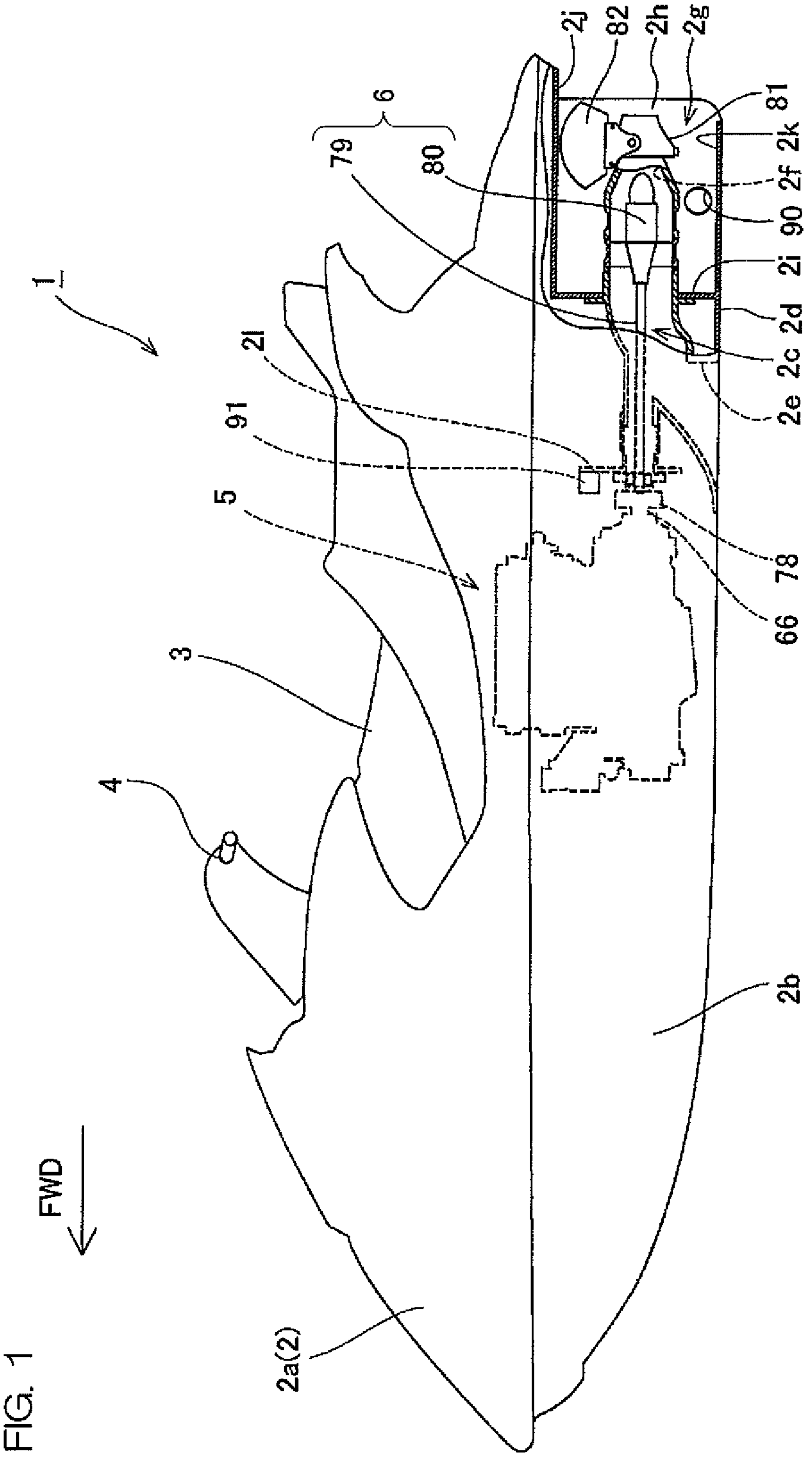
FIG. 1 is a side view of an overall arrangement of a water jet propulsion watercraft according to a first preferred embodiment of the present invention.

FIG. 1 is a side view of an overall arrangement of the water jet propulsion watercraft according to the first preferred embodiment of the present invention. The water jet propulsion watercraft 1 includes a hull 2, an engine 5, and a jet propulsion device 6. The hull 2 includes a deck 2*a* and a hull body 2*b*, and a seat 3 is disposed at an upper portion thereof. A steering apparatus 4 arranged to be operated by an operator for steering the hull 2 is disposed in front of the seat 3. The engine 5 is an internal combustion engine that is installed in an engine room formed in an interior of the hull 2. The jet propulsion device 6 is driven by a driving force of the engine 5 and applies a propulsive force to the hull 2 by drawing in water from around the hull and jetting the water.

Figure 2:
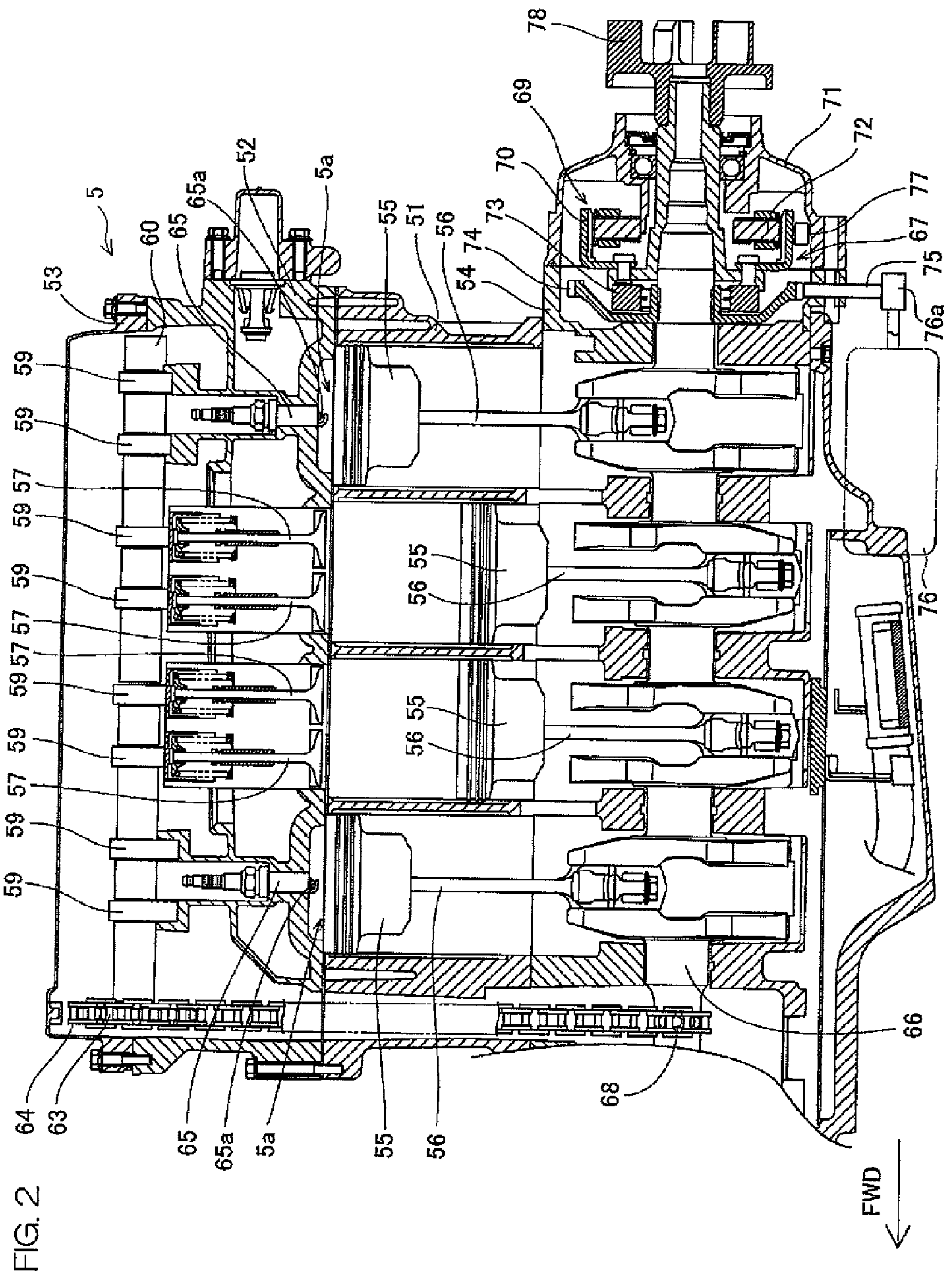
FIG. 2 is a sectional view for describing an arrangement of an engine of the water jet propulsion watercraft.

FIG. 2 is a sectional view of the engine 5. The engine 5 includes a cylinder body 51, a cylinder head 52, a cylinder head cover 53, a crankshaft 66, and a crankcase 54. Four pistons 55 are slidably disposed in the cylinder body 51. To each of the four pistons 55, one end portion of a connecting rod 56 is attached in a rotatable manner. The cylinder head 52 is disposed so as to close an opening at one side of the cylinder body 51. Combustion chambers 5*a* of the engine 5 are partitioned into respective regions surrounded by the cylinder body 51, the cylinder head 52, and the respective pistons 55.

Figure 3:
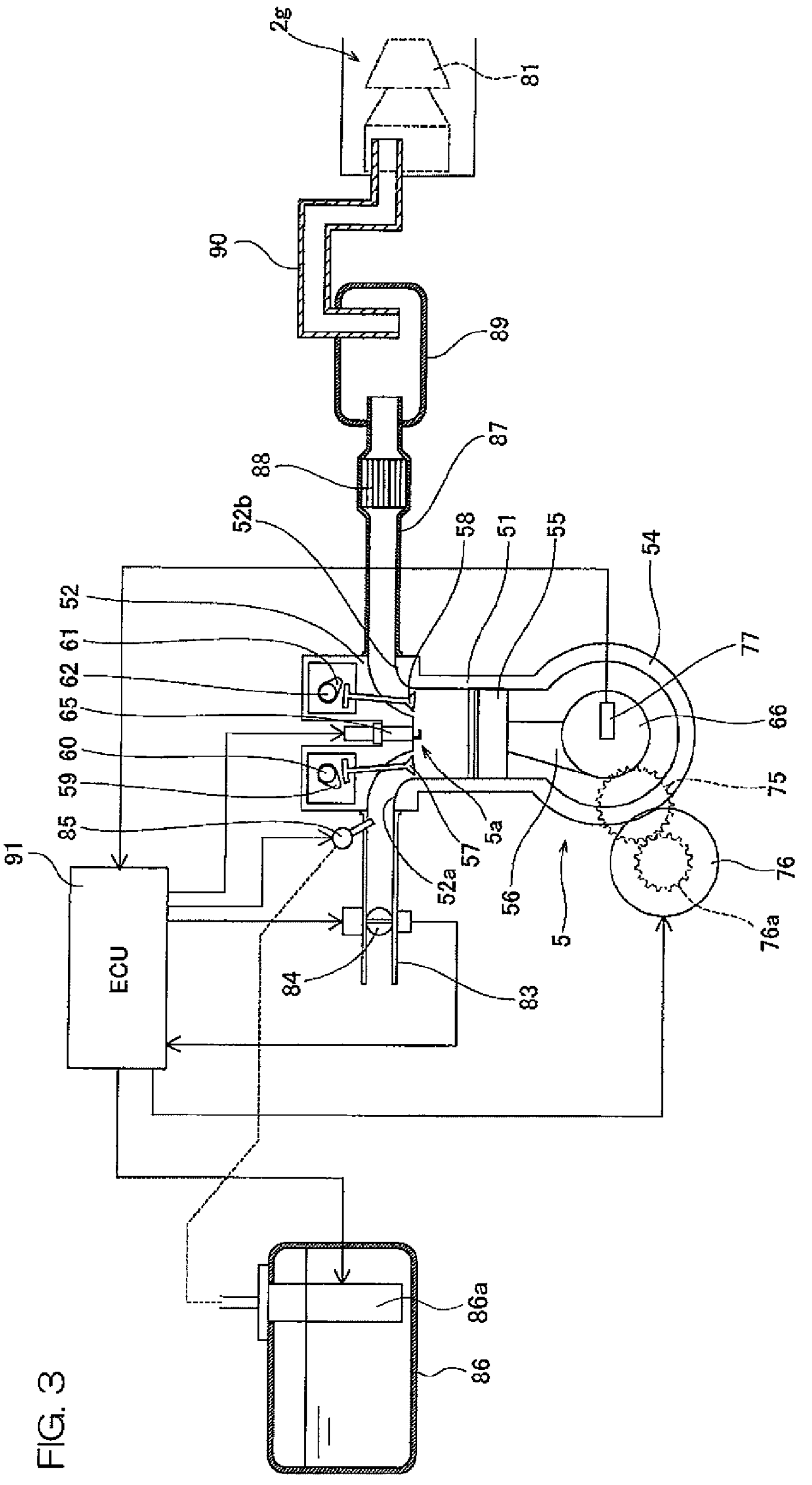
FIG. 3 is a block diagram for describing an arrangement related to the engine of the water jet propulsion watercraft.
Figure 4:
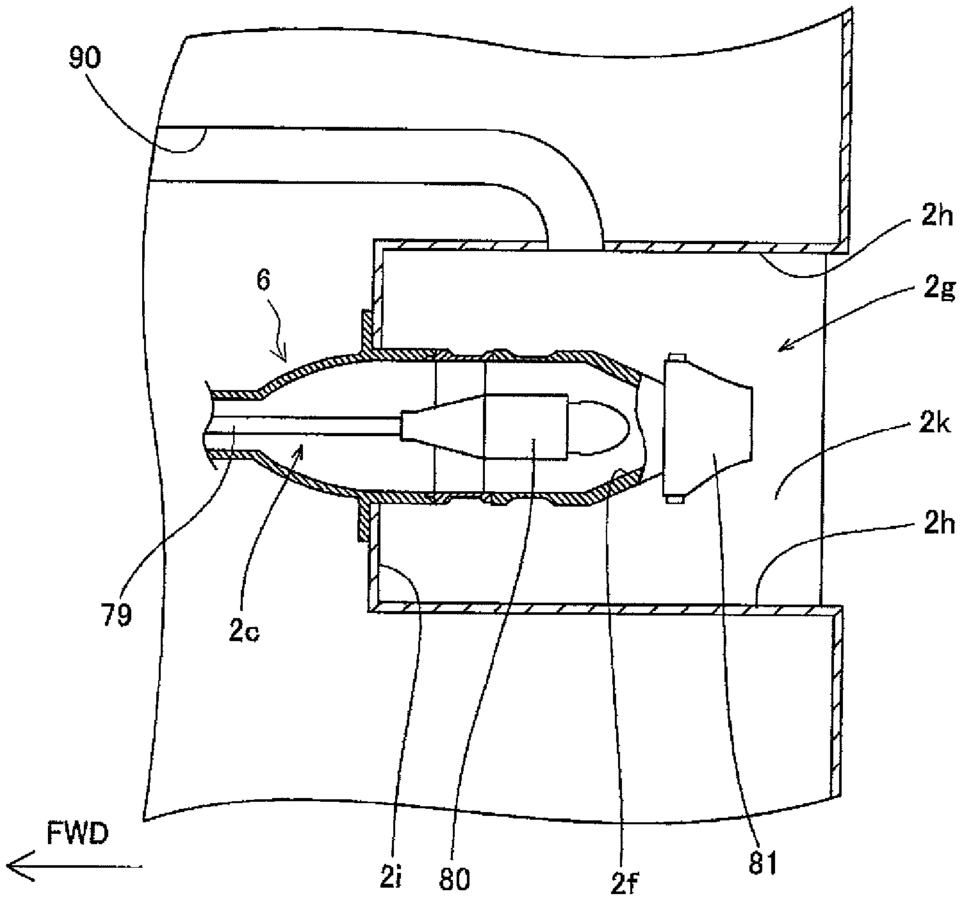
FIG. 4 is a sectional view for describing a structure in a vicinity of a pump chamber of the water jet propulsion watercraft.

As shown in FIG. 3, the cylinder head 52 is provided with an intake port 52*a* and an exhaust port 52*b*. The intake port 52*a* is connected to the combustion chamber 5*a* and air and fuel that flow into the combustion chamber 5*a* pass therethrough. After combustion of the fuel in the combustion chamber 5*a*, exhaust gas is discharged via the exhaust port 52*b*. An intake valve 57 and an exhaust valve 58 are disposed in the intake port 52*a* and the exhaust port 52*b*, respectively. The intake valve 57 is arranged to be capable of opening and closing the intake port 52*a* and has a function of adjusting a flow rate of the air that flows into the combustion chamber 5*a*. The exhaust valve 58 is arranged to be capable of opening and closing the exhaust port 52*b* and has a function of adjusting a flow rate of the exhaust gas discharged from the combustion chamber 5*a*.

A cam 59 arranged to move the intake valve 57 at a predetermined timing, and a camshaft 60 arranged to rotate the cam 59 are disposed in the cylinder head 52. Further, a cam 61 arranged to move the exhaust valve 58 at a predetermined timing, and a camshaft 62 arranged to rotate the cam 61 are disposed in the cylinder head 52.

Also, as shown in FIG. 2, a sprocket 63 is attached to one side of the camshaft 60. Likewise, a sprocket (not shown) is also attached to one side of the camshaft 62 (see FIG. 3). A cam chain 64 is engaged with the pair of sprockets.

The cam chain 64 is further engaged with a sprocket 68 of the crankshaft 66. The cam chain 64 is thus driven as the crankshaft 66 rotates. That is, the camshafts 60 and 62 (see FIG. 3) are respectively arranged to be rotated by the crankshaft 66 being rotated. Put in another way, the crankshaft 66 is a drive source that causes the intake valve 57 and the exhaust valve 58 to move (see FIG. 3), respectively.

The cylinder head 52 is provided with four ignition plugs 65 corresponding to the four pistons 55. A tip portion 65*a* of each ignition plug 65 protrudes toward the corresponding combustion chamber 5*a*. The cylinder head cover 53 is attached to the cylinder head 52 so as to cover the camshafts 60 and 62 (see FIG. 3).

The crankshaft 66 is disposed so as to extend in a front/rear direction in the crankcase 54. The other end portion of each connecting rod 56 is rotatably attached to the crankshaft 66. The crankshaft 66 is thereby arranged to be rotated while the pistons 55 slide up and down. A rear portion of the crankshaft 66 protrudes to a rear of the crankcase 54 and is housed in an interior of an auxiliary machinery chamber 67. The sprocket 68 is provided on a front side (FWD arrow direction side) portion of the crankshaft 66. The sprocket 68 is engaged with the cam chain 64 as described above. The camshafts 60 and 62 are thereby arranged to rotate respectively with the crankshaft 66 being rotated.

The cams 59 and 61 (see FIG. 3) are arranged to operate so that the exhaust gas, retained in the combustion chamber 5*a* during starting of the engine 5, can be delivered to the exhaust port 52*b*. Specifically, the cams 59 and 61 are arranged such that there is a timing at which the intake valve 57 is opened and the exhaust valve 58 is closed when the piston 55 moves downward. The cams 59 and 61 are further arranged such that there is a timing at which the intake valve 57 is closed and the exhaust valve 58 is opened when the piston 55 moves upward.

Referring again to FIG. 2, the auxiliary machinery chamber 67 is arranged to provide a housing space for housing auxiliary machinery accessory to the engine 5, which is the main machinery. One of the auxiliary machinery housed in the auxiliary machinery chamber 67 is a power generating apparatus 69. The power generating apparatus 69 includes a rotor unit 70 and a stator unit 72. The rotor unit 70 is attached to a rear portion of the crankshaft 66. The stator unit 72 is attached to a cover member 71 that defines a rear portion of the auxiliary machinery chamber 67. The power generating apparatus 69 is arranged to generate electricity by the rotor unit 70 being rotated with the rotation of the crankshaft 66.

A gear member 74 is attached via a one-way clutch 73 to the crankshaft 66 in front of the power generating apparatus 69. The gear member 74 is coupled via an intermediate gear 75 to a gear 76*a* of a starter motor 76. The starter motor 76 has a function of rotating the crankshaft 66 via the intermediate gear 75, the gear member 74, and the one-way clutch 73 when the engine 5 is started.

A crank angle sensor 77 is provided at a side of the rotor unit 70 in the auxiliary machinery chamber 67. The crank angle sensor 77 has a function of detecting rotation of the rotor unit 70. That is, the crank angle sensor 77 is arranged to detect a rotation position of the crankshaft 66. The crank angle sensor 77 is an example of a "detection unit" according to a preferred embodiment of the present invention. The crankshaft 66 is coupled to the intake valve 57 via the cam chain 64, the camshaft 60, and the cam 59. Whether or not the intake valve 57 closes the intake port 52*a* can thus be detected by detecting a rotation position of the crankshaft 66 by the crank angle sensor 77. Likewise, the crankshaft 66 is coupled to the exhaust valve 58 (see FIG. 3) via the cam chain 64, the camshaft 62 (see FIG. 3), and the cam 61 (see FIG. 3). Whether or not the exhaust valve 58 closes the exhaust port 52*b* (see FIG. 3) can thus be detected by detecting the rotation position of the crankshaft 66 by the crank angle sensor 77.

As shown in FIG. 1 and FIG. 2, a coupling member 78 is attached to a rear end portion of the crankshaft 66. As shown in FIG. 1, the coupling member 78 is arranged to connect a drive shaft 79 of the jet propulsion device 6 (water jet pump) to the crankshaft 66. The jet propulsion device 6 includes the drive shaft 79 and an impeller 80. The impeller 80 is attached to a rear portion of the drive shaft 79. The impeller 80 is arranged to be rotated with the rotation of the drive shaft 79.

The impeller 80 is disposed in a water passage portion 2*c*, defined at a lower portion of the hull 2. By rotation of the impeller 80, water surrounding the hull 2 is pumped up from a water inflow portion 2*e* of a hull bottom 2*d* to the water passage portion 2*c*. Further, the water that has been pumped up is passed through the water passage portion 2*c* and jetted from a water discharge portion 2*f* at a rear portion of the hull 2 by the rotation of the impeller 80.

The water discharge portion 2*f* is provided in a pump chamber 2*g* that is provided at a rear portion of the hull body 2*b*. The pump chamber 2*g* is defined by the surrounding five surfaces including a pair of side surface portions 2*h* (see FIG. 4) provided at respective sides of the water discharge portion 2*f*, a front surface portion 2*i* in front of the water discharge portion 2*f*, an upper surface portion 2*j* above the water discharge portion 2*f*, and a lower surface portion 2*k* below the water discharge portion 2*f*. A deflector 81 that controls a jetting direction of the water so as to change the direction to the left and right is attached to the water discharge portion 2*f*. Further, a reverse bucket 82, which reverses the direction of the water jetted from the water discharge portion 2*f* to the FWD arrow direction during reverse drive, is attached to the water discharge portion 2*f*.

As shown in FIG. 3, an intake pipe 83 is connected to the intake port 52*a* of the engine 5. The intake pipe 83 is arranged to provide a passage for flow of air and fuel into the intake port 52*a* of the engine 5. A throttle valve 84 that adjusts a flow amount of the air that flows into the intake port 52*a* is arranged in the intake pipe 83. Also, an injector 85 arranged to inject fuel toward the intake port 52*a* is provided at a downstream side of the throttle valve 84 of the intake pipe 83. The injector 85 is an example of a "fuel injection apparatus" according to a preferred embodiment of the present invention. The injector 85 is connected to a fuel tank 86. The fuel to be injected from the injector 85 is stored in the fuel tank 86.

An exhaust pipe 87 is connected to the exhaust port 52*b* of the engine 5. The exhaust pipe 87 is an example of an "exhaust channel" according to a preferred embodiment of the present invention. The exhaust pipe 87 is a passage through which the exhaust gas discharged from the exhaust port 52*b* of the engine 5 flows. A catalyst unit 88, which decomposes a portion of components in the exhaust gas generated in the combustion chamber 5*a* into carbon dioxide, water, etc., is provided in the exhaust pipe 87. Also, a water lock 89, which prevents inflow of water into the exhaust pipe 87, is connected to a discharge side of the exhaust pipe 87. Discharge piping 90 is connected to the water lock 89. The discharge piping 90 is connected to the pump chamber 2*g* and is arranged to discharge the exhaust gas into the pump chamber 2*g*.

The water lock 89 is preferably a sealed container. At one side wall thereof, the exhaust pipe 87 is introduced into an interior at a position of predetermined height from a bottom wall. An exit end of the exhaust pipe 87 protrudes inward by a predetermined length from the side wall. The discharge piping 90 is introduced from a top wall of the water lock 89 and an entrance end thereof is disposed near the bottom wall. The discharge piping 90 is made, for example, of a resin material. The discharge piping 90 is arranged such that an intermediate portion thereof is higher than a waterline in a stationary state of the watercraft. By this arrangement, the exhaust gas is discharged into water inside the pump chamber 2*g* and the surrounding water is unlikely to enter into the exhaust pipe 87.

As shown in FIG. 1, an ECU (engine control unit) 91, which controls driving of the engine 5, is arranged on a bulkhead 21 to the rear of the engine 5. The ECU 91 is an example of an "engine control unit" according to a preferred embodiment of the present invention. As shown in FIG. 3, the ECU 91 is connected to the ignition plugs 65, the starter motor 76, the crank angle sensor 77, the throttle valve 84, the injector 85, a fuel pump 86*a*, etc., of the engine 5. The ECU 91 may be arranged to control not just the engine 5 but also to equipment other than the engine 5 as well. The fuel pump 86*a* is provided inside the fuel tank 86 and is arranged to deliver the fuel in the fuel tank 86 to the injector 85.

When the engine 5 stops, the ECU 91 judges, based on the detection result of the crank angle sensor 77, whether or not the intake valve 57 is stopped at a position (closed position) closing the intake port 52*a*. If the intake valve 57 is not stopped at the closed position, the ECU 91 determines that the intake valve 57 is stopped at a position (open position) opening the intake port 52*a*. Likewise, the ECU 91 judges, based on the detection result of the crank angle sensor 77, whether or not the exhaust valve 58 is stopped at a position closing (closed position) the exhaust port 52*b*. If the exhaust valve 58 is not stopped at the closed position, the ECU 91 determines that the exhaust valve 58 is stopped at a position (open position) opening the exhaust port 52*b*.

The ECU 91 is arranged to drive the starter motor 76 if it determines that both the intake valve 57 and the exhaust valve 58 are stopped at the respective open positions when the engine 5 is stopped. More specifically, the ECU 91 is arranged to drive the starter motor 76 until at least one of the intake valve 57 or the exhaust valve 58 moves to the closed position. It thereby becomes possible to block at least one location in the path leading from the exhaust pipe 87 to the intake port 52*a* when the driving of the engine 5 is stopped.

Further, if the ECU 91 determines that both the intake valve 57 and the exhaust valve 58 are stopped at the respective open positions when starting of the engine 5 is performed, the ECU 91 is arranged to drive the starter motor 76 for a predetermined period in a state where fuel is not injected from the injector 85. When the crankshaft 66 is rotated, the piston 55, the intake valve 57, and the exhaust valve 58 are driven. It thereby becomes possible to deliver the exhaust gas, retained at the intake side relative to the exhaust port 52*b* (i.e., upstream of the exhaust port 52*b*), to the exhaust pipe 87 side in advance before the fuel is injected.

Figure 5:
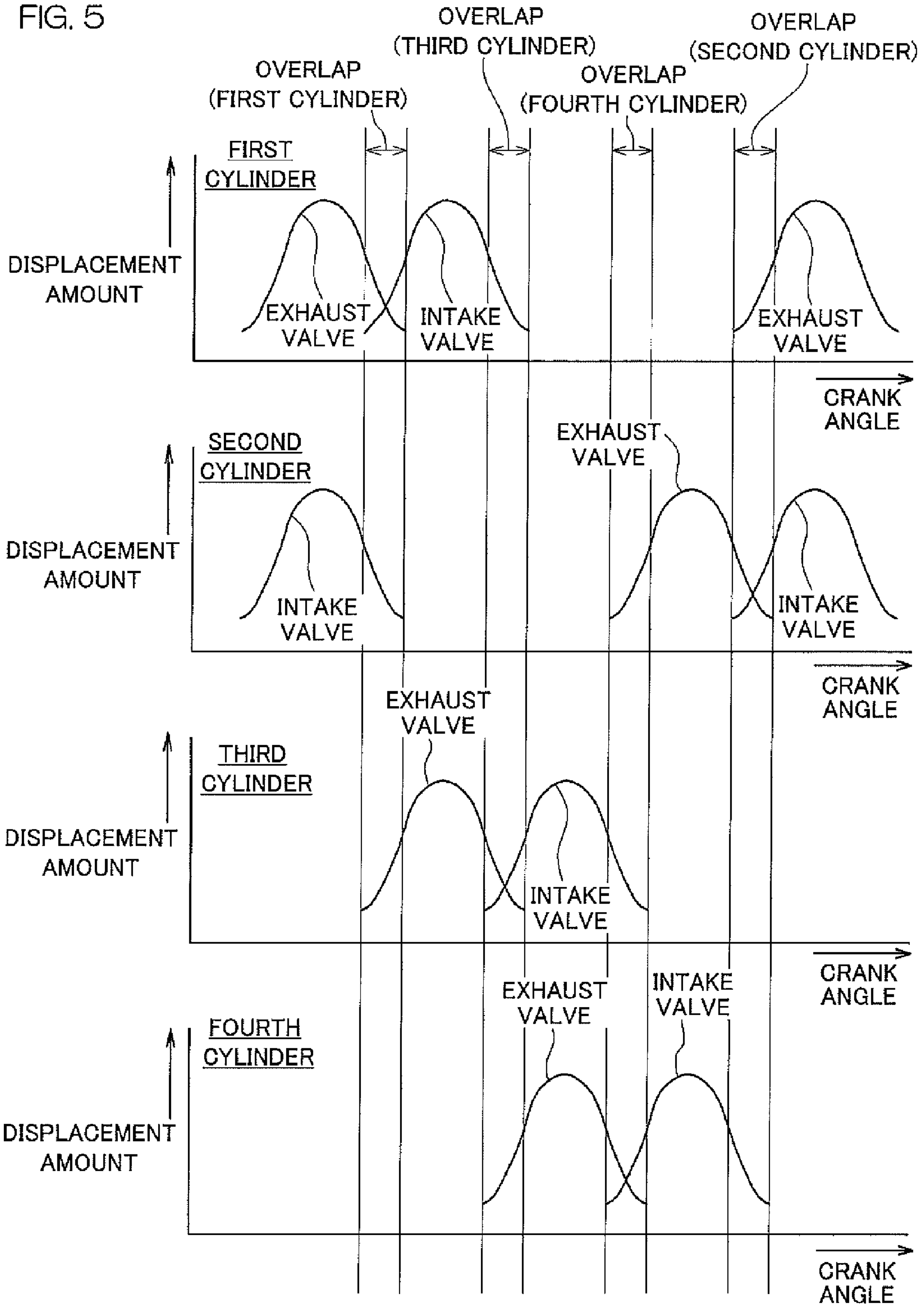
FIG. 5 is a diagram for describing operation timings of intake valves and exhaust valves of four cylinders.

FIG. 5 is a diagram for describing operations of the intake valves 57 and the exhaust valves 58 of the four cylinders provided in the engine 5. The engine 5 preferably is, for example, a serial, four-cylinder, four-cycle engine. The four cylinders that are aligned in series will be referred to as the first cylinder, the second cylinder, the third cylinder, and the fourth cylinder in that order from the front side. Successive ignition in the first to the fourth cylinders is to be performed cyclically in the order of: first cylinder→fourth cylinder→third cylinder→second cylinder→first cylinder→ . . . . In each cylinder, the exhaust valve 58 is displaced to open and close the exhaust port 52*b* and in succession, the intake valve 57 is displaced to open and close the intake port 52*a*. The intake valve 57 begins to be displaced in an opening direction before the exhaust valve 58 is completely closed, so that there is an overlap period in which both the exhaust valve 58 and the intake valve 57 are in the open state. The ignition timings of the four cylinders are shifted and thus the overlap periods of the four cylinders are shifted with respect to each other and do not overlap. That is, four overlap periods that are separated in time occur while the crank angle is angularly displaced by 720 degrees (two rotations). In each overlap period, a communication path leads from the exhaust pipe 87 to the intake pipe 83 through the combustion chamber in the corresponding cylinder.

Figure 6:
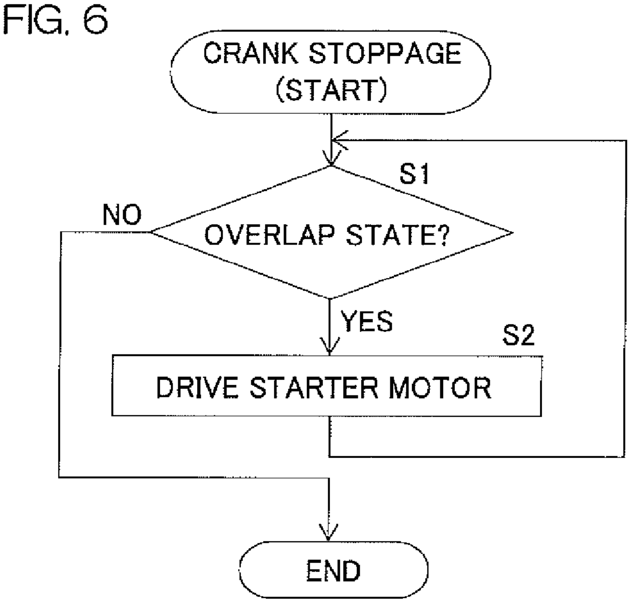
FIG. 6 is a flowchart for describing a process performed by an ECU when driving of the engine of the water jet propulsion watercraft is stopped.

Details of the control executed by the ECU 91 when the engine 5 is stopped will now be described with reference to FIG. 3 and FIG. 6. When the engine 5 is stopped, the ECU 91 executes the control for stopping at least one of the intake valve 57 or the exhaust valve 58 at the position at which at least one of the intake port 52*a* or the exhaust port 52*b* is closed.

When a user operates an unillustrated engine stop switch of the engine 5 (see FIG. 3), the ECU 91 determines whether or not both the intake valve 57 and the exhaust valve 58 are stopped at the respective open positions (whether or not the valves are in the overlap state) (step S1). Specifically, the ECU 91 computes displacement amounts of both the intake valves 57 and the exhaust valves 58 of the respective cylinders based on the crank angle (position of the crankshaft 66) detected by the crank angle sensor 77. Then, based on the computed displacement amounts, the ECU 91 determines whether or not both the intake valve 57 and the exhaust valve 58 are stopped at the respective open positions in any of the cylinders. If the crank angle range corresponding to the overlap period is known, the ECU 91 may determine whether or not both the intake valve 57 and the exhaust valve 58 are in the open states by determining whether or not the crank angle is within the overlap period (see FIG. 5).

If it is determined that both the intake valve 57 and the exhaust valve 58 are stopped at the respective open positions in any of the cylinders (step S1: YES), the ECU 91 drives the starter motor 76 by a predetermined drive amount. Thereafter, the ECU 91 repeats the process from step S1. That is, after driving the starter motor 76 by the predetermined drive amount, the ECU 91 drives the starter motor 76 again if it judges that both the intake valve 57 and the exhaust valve 58 are stopped at the respective open positions in any of the cylinders.

If it is determined that both the intake valve 57 and the exhaust valve 58 are not stopped at the respective open positions in any of the cylinders (step S1: NO), that is, if the crank angle does not correspond to any of the overlap periods, the ECU 91 ends the process. Even after the engine 5 (crankshaft 66) is stopped, the ECU 91 continues operation without stopping to perform the control process of steps S1 and S2 described above.

Figure 7:
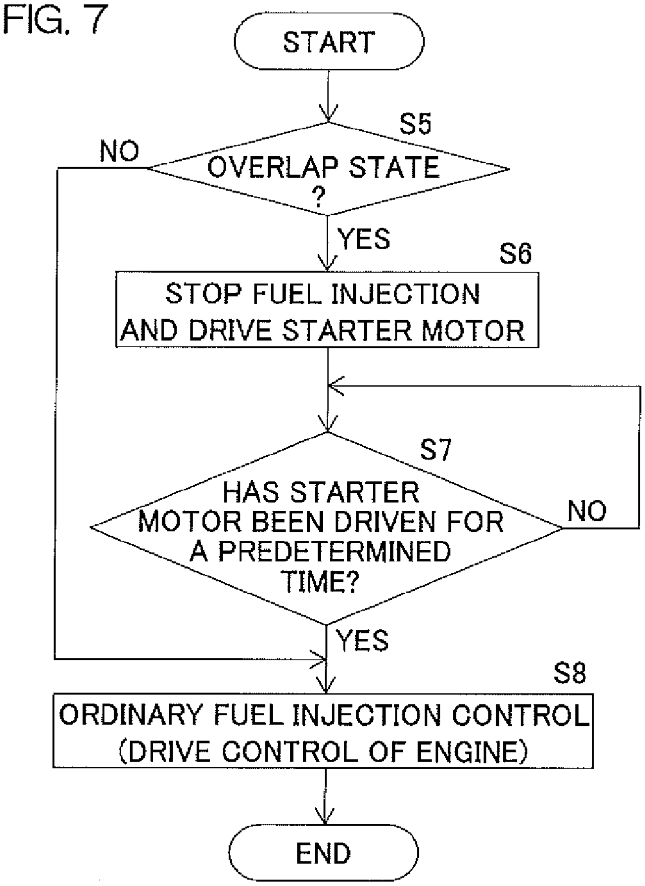
FIG. 7 is a flowchart for describing a process performed by the ECU when the engine of the water jet propulsion watercraft is started.

Next, details of the control executed by the ECU 91 when the engine 5 is started will now be described with reference to FIG. 3 and FIG. 7. When the engine 5 is started, the ECU 91 executes the control for delivering the exhaust gas, retained at the intake side relative to the exhaust port 52*b*, to the exhaust pipe 87 side.

When the user operates an unillustrated engine start switch of the engine 5 (see FIG. 3), the ECU 91 determines whether or not both the intake valve 57 and the exhaust valve 58 are stopped at the respective open positions (whether or not the valves are in the overlap state). Specifically, the ECU 91 computes the displacement amounts of both the intake valves 57 and the exhaust valves 58 of the respective cylinders based on the crank angle (position of the crankshaft 66) detected by the crank angle sensor 77. Then, based on the computed displacement amounts, the ECU 91 determines whether or not both the intake valve 57 and the exhaust valve 58 are stopped at the respective open positions. If the crank angle range corresponding to the overlap period is known, the ECU 91 may determine whether or not both the intake valve 57 and the exhaust valve 58 are in the open states by determining whether or not the crank angle is within the overlap period (see FIG. 5).

In the first preferred embodiment, when the engine 5 is stopped, at least one of the intake valve 57 or the exhaust valve 58 is controlled to close at least one of the intake port 52*a* or the exhaust port 52*b*. However, while the engine 5 is stopped, the crankshaft 66 may be rotated by an externally applied physical force, etc. It is thus plausible that both the intake valve 57 and the exhaust valve 58 may be stopped at the respective open positions when the engine 5 is started. In step S5, the ECU 91 judges whether or not such a circumstance has arisen.

If in step S5, it is determined that both the intake valve 57 and the exhaust valve 58 are not stopped at the respective open positions, the process of the ECU 91 enters step S8. Also, in step S5, if it is determined that both the intake valve 57 and the exhaust valve 58 are stopped at the respective open positions, the process of the ECU 91 enters step S6. In step S6, the ECU 91 drives the starter motor 76 in a state where fuel injection from the injector 85 is prohibited. The crankshaft 66 thereby rotates and the piston 55 is moved in the up/down direction.

Thereafter, in step S7, the ECU 91 determines whether the starter motor 76 has been driven for the predetermined period (approximately 3 seconds, for example). For example, the crankshaft 66 may be arranged to rotate approximately five times, for example, when the starter motor 76 is driven for approximately 3 seconds. The ECU 91 continues the driving of the starter motor 76 until the predetermined time elapses (step S7).

When the ECU 91 determines that the starter motor 76 has been driven for the predetermined period (approximately 3 seconds, for example), it starts control of injecting the fuel from the injector 85 (step S8). The ECU 91 thus ends the control for delivering the exhaust gas, retained at the intake side relative to the exhaust port 52*b*, to the exhaust pipe 87 side and then starts the drive control of the engine 5. In the period until the engine 5 is started, the ECU 91 determines the fuel injection amount injected from the injector 85 in accordance with a start map that defines the fuel injection amount for starting the engine 5 and controls the injector 85 according to this fuel injection amount. The start map is a map by which the fuel injection amount is set in advance, for example, according to an engine temperature, intake temperature, atmospheric pressure, throttle opening, etc.

The process in step S6 is a process of setting the fuel injection amount to zero regardless of the fuel injection setting value of the start map. However, the fuel injection amount applied in the process of step S6 does not necessarily have to be zero, and a fuel injection amount that is less than an ordinary fuel injection amount applied during starting may be applied.

As described above, in the first preferred embodiment, at least one location in the path leading from the exhaust pipe 87 to the intake port 52*a* is blocked when the driving of the engine 5 is stopped. The exhaust gas retained in the exhaust pipe 87 can thereby be prevented from flowing to the intake side. For example, if the hull 2 receives a wave from the rear when the engine 5 is stopped, water is introduced into the water lock 89 via the discharge piping 90. The air inside the water lock 89 is thereby compressed and the air inside the water lock 89 thus flows into the exhaust pipe 87. At this time, if the path leading from the exhaust pipe 87 to the intake pipe 83 through the combustion chamber 5*a* is open, the exhaust gas retained inside the exhaust pipe 87 is forced toward the combustion chamber 5*a* and the intake side. However, in the present preferred embodiment, the flow of the exhaust gas, retained in the exhaust pipe 87, to the intake side can be minimized or prevented because at least one location in the path leading from the exhaust pipe 87 to the intake port 52*a* (at least one of the intake port 52*a* or the exhaust port 52*b*) is blocked. Difficulty in igniting the fuel in restarting the engine 5 can thus be minimized. Consequently, the engine 5 can be restarted smoothly. Further, by improvement of a restarting property of the engine 5, an emission amount of non-combusted fuel can be minimized. In addition, combustion of fuel in the catalyst 88 can be minimized because a large amount of non-combusted fuel can be prevented from reaching the catalyst 88. The catalyst 88 can thereby be protected against abnormal overheating.

Further, in the first preferred embodiment, when the starting of the engine 5 is performed, the starter motor 76 is driven for the predetermined period (approximately 3 seconds, for example) in the state where the fuel is not injected from the injector 85. The exhaust gas retained at the intake side relative to the exhaust port 52*b* is thereby delivered to the exhaust pipe 87 side. Gases of components that hinder combustion (for example, carbon dioxide and other gases besides oxygen) can thereby be discharged from the combustion chamber 5*a* in advance. The fuel injection from the injector 85 is thus started after the concentrations of these components have been lowered in advance. The injected fuel can thereby be ignited reliably after the start of fuel injection. Consequently, the engine 5 can be restarted smoothly.

Further, the ECU 91 is arranged to move the piston 55 by rotating the crankshaft 66 by driving the starter motor 76 for the predetermined period (for example, approximately 3 seconds) when the starting of the engine 5 is performed. At least the exhaust gas retained in the combustion chamber 5*a* can thereby be delivered to the exhaust pipe 87 side by use of the arrangement provided in the engine 5.

Second Preferred Embodiment

Figure 8:
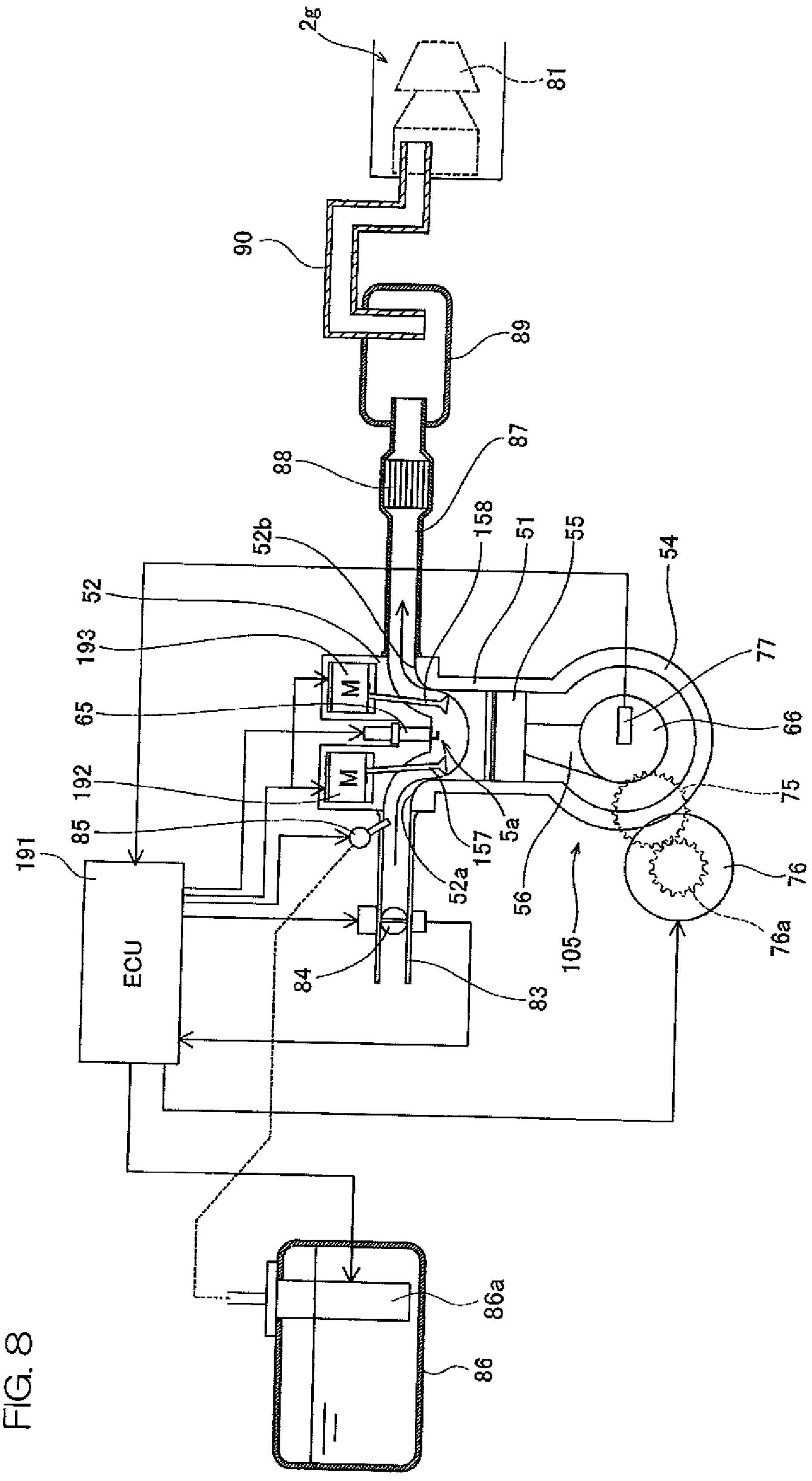
FIG. 8 is a block diagram for describing an arrangement related to an engine of a water jet propulsion watercraft according to a second preferred embodiment of the present invention.

Next, an arrangement of an engine of a water jet propulsion watercraft according to a second preferred embodiment of the present invention will now be described in detail with reference to FIG. 8. In the second preferred embodiment, the engine 105 includes an intake solenoid valve 192 and an exhaust solenoid valve 193. The intake solenoid valve 192 and the exhaust solenoid valve 193 are arranged to respectively move an intake valve 157 and an exhaust valve 158 in the direction of opening and the direction of closing the intake port 52*a* and the exhaust port 52*b*.

The intake solenoid valve 192, which causes the intake valve 157 to move at a predetermined timing, is disposed on the cylinder head 52 of the engine 105. The intake solenoid valve 192 is an example of a "first actuator" and a "first solenoid valve" according to a preferred embodiment of the present invention. The intake solenoid valve 192 has a function of making the intake valve 157 move to the open position of opening the intake port 52*a* and the closed position of closing the intake port 52*a*. Further, the exhaust solenoid valve 193, which causes the exhaust valve 158 move at a predetermined timing, is disposed on the cylinder head 52 of the engine 105. The exhaust solenoid valve 193 is an example of a "second actuator" and a "second solenoid valve" according to a preferred embodiment of the present invention. The exhaust solenoid valve 193 has a function of making the exhaust valve 158 move to the open position of opening the exhaust port 52*b* and the closed position of closing the exhaust port 52*b*.

The intake solenoid valve 192 and the exhaust solenoid valve 193 are respectively connected to an ECU 191 and are arranged to be driven and controlled by the ECU 191. That is, the intake solenoid valve 192 and the exhaust solenoid valve 193 are arranged to be drivable independently of each other. The ECU 191 is arranged to be capable of controlling the intake solenoid valve 192 so as to close the intake port 52*a* when the engine 105 is stopped. The ECU 191 is an example of the "engine control unit" and the "detection unit" according to a preferred embodiment of the present invention.

The ECU 191 is arranged to detect whether or not the intake port 52*a* is closed by the intake valve 157 by detecting a drive status of the intake solenoid valve 192. Further, the ECU 191 is arranged to detect whether or not the exhaust port 52*b* is closed by the exhaust valve 158 by detecting a drive status of the exhaust solenoid valve 193.

The ECU 191 is arranged to drive the starter motor 76 for a predetermined period (approximately 3 seconds, for example) in a state where fuel is not injected by the injector 85 when starting of the engine 105 is performed. The crankshaft 66 is thereby rotated and the piston 55 moves in the up/down direction accordingly. The ECU 191 is also arranged to drive the intake valve 157 and the exhaust valve 158 in accordance with the operation of the piston 55 to deliver the exhaust gas, retained in the combustion chamber 5*a* when the engine 105 is started, to the exhaust port 52*b*. More specifically, during the starting of the engine 105, the ECU 191 performs a control to open the intake valve 157 and close the exhaust valve 158 when the piston 55 is moved downward. Further, the ECU 191 performs a control to close the intake valve 157 and open the exhaust valve 158 when the piston 55 is moved upward. The exhaust gas, retained at the intake side relative to the exhaust port 52*b*, can thereby be delivered to the exhaust pipe 87 side prior to fuel injection control.

During ordinary running of the engine 105, the ECU 191 controls the intake solenoid valve 192 and the exhaust solenoid valve 193 to open and close the intake valve 157 and the exhaust valve 158, for example, at the timings shown in FIG. 5. That is, arrangements are made such that the overlap period in which both the intake valve 157 and the exhaust valve 158 open simultaneously, occurs.

The structure besides the above of the second preferred embodiment is the same as that of the first preferred embodiment.

Figure 9:
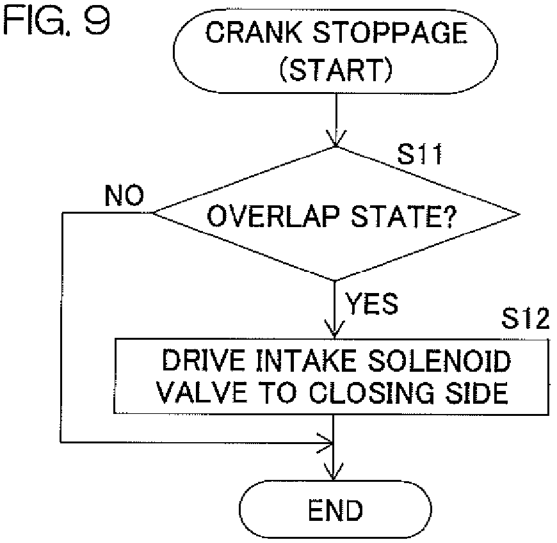
FIG. 9 is a flowchart for describing a process performed by an ECU when driving of the engine of the water jet propulsion watercraft according to the second preferred embodiment is stopped.

Next, details of the control executed by the ECU 191 when the driving of the engine 105 is stopped will now be described with reference to FIG. 8 and FIG. 9. When the engine 105 is stopped, the ECU 191 executes a control for stopping at least one of the intake valve 157 or the exhaust valve 158 at the position at which at least one of the intake port 52*a* or the exhaust port 52*b* is closed.

When the user operates an unillustrated engine stop switch of the engine 105 (see FIG. 8), the ECU 191 determines whether or not both the intake valve 157 and the exhaust valve 158 are stopped at the respective open positions (whether or not the valves are in the overlap state) in any of the cylinders (step S11). Specifically, the ECU 191 determines the positions of the intake valves 157 and the exhaust valves 158 based on the drive statuses of the intake solenoid valves 192 and the exhaust solenoid valves 193. If the crank angle range corresponding to the overlap period is known, the ECU 191 may determine whether or not both the intake valve 157 and the exhaust valve 158 are in the open states by determining whether or not the crank angle is within the overlap period (see FIG. 5).

If it is determined that both the intake valve 157 and the exhaust valve 158 are stopped at the respective open positions in any of the cylinders (step S11: YES), the ECU 191 drives the intake solenoid valve 192 to drive the intake valve 157 to the closed position (step S12). The intake port 52*a* is thereby closed by the intake valve 157. Thereafter, ECU 191 ends process. Thus, the operation of the ECU 191 stops after the stoppage of the engine 105.

If it is determined that both the intake valve 157 and the exhaust valve 158 are not stopped at the respective open positions in any of the cylinders (step S11: NO), that is, if the crank angle does not correspond to any of the overlap periods, the ECU 191 ends the process. That is, the operation of the ECU 191 stops after the stoppage of the engine 105 without either of the intake solenoid valve 192 and the exhaust solenoid valve 193 being driven.

Figure 10:
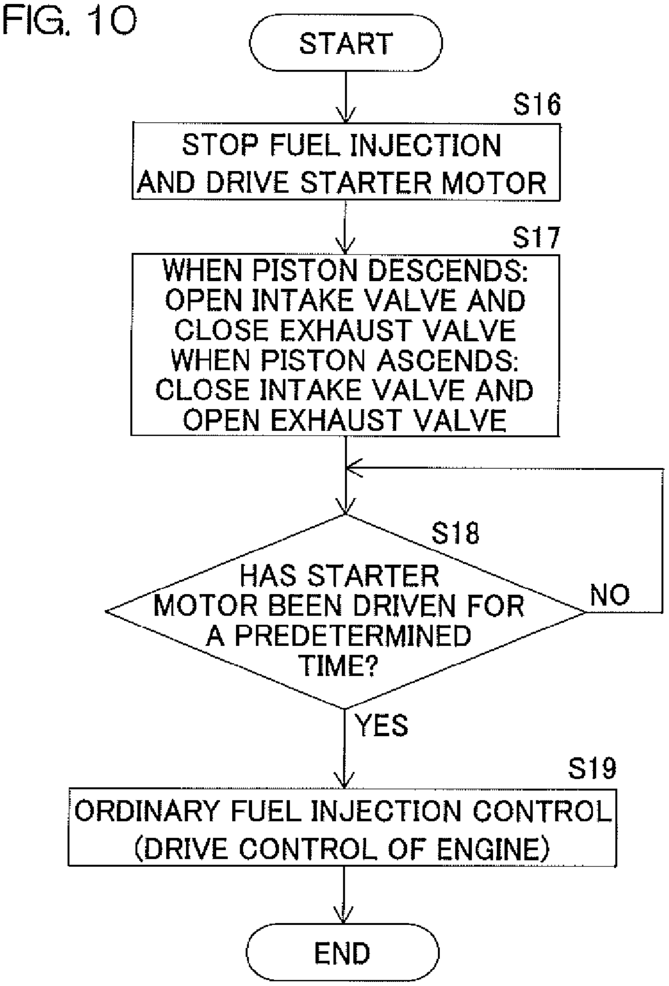
FIG. 10 is a flowchart for describing a process performed by the ECU when the engine of the water jet propulsion watercraft according to the second preferred embodiment is started.

Next, details of the control executed by the ECU 191 when the engine 105 is started will now be described with reference to FIG. 8 and FIG. 10. When the engine 105 is started, the ECU 191 executes the control for delivering the exhaust gas, retained at the intake side relative to the exhaust port 52*b*, to the exhaust pipe 87 side.

When the user operates an unillustrated engine start switch of the engine 105 (see FIG. 8), the ECU 191 drives, in step S16, the starter motor 76 in the state where fuel injection from the injector 85 is prohibited. The crankshaft 66 thereby rotates and the piston 55 is moved in the up/down direction.

Further, in step S17, the ECU 191 drives the intake solenoid valve 192 and the exhaust solenoid valve 193 respectively to drive the intake valve 157 and the exhaust valve 158. In this case, the ECU 191 drives the intake valve 157 and the exhaust valve 158 regardless of a stroke of the engine 105. More specifically, in the crank angle range in which the piston 55 descends (moves away from the cylinder head 52 and expands the combustion chamber 5*a*), the ECU 191 controls the solenoid valves 192 and 193 to open the intake valve 157 and close the exhaust valve 158. Further, in the crank angle range in which the piston 55 ascends (approaches the cylinder head 52 and compresses the combustion chamber 5*a*), the ECU 191 controls the solenoid valves 192 and 193 to close the intake valve 157 and open the exhaust valve 158. The exhaust gas retained at the intake side relative to the exhaust port 52*b* can thereby be delivered efficiently to the exhaust pipe 87 side.

Thereafter, in step S18, the ECU 191 determines whether the starter motor 76 has been driven for the predetermined period (approximately 3 seconds, for example). For example, the crankshaft 66 may be arranged to rotate approximately five times, for example, when the starter motor 76 is driven for approximately 3 seconds. The ECU 191 continues the driving of the starter motor 76 until the predetermined time elapses (step S18).

When the ECU 191 determines that the starter motor 76 has been driven for the predetermined period (approximately 3 seconds, for example), it starts control for injecting the fuel from the injector 85 (step S19). The ECU 191 thus ends the control for delivering the exhaust gas, retained at the intake side relative to the exhaust port 52*b*, to the exhaust pipe 87 side and then starts the drive control of the engine 105.

As described above, in the second preferred embodiment, when the starting of the engine 105 is performed, the starter motor 76 is driven for the predetermined period (approximately 3 seconds, for example) in the state where the fuel is not injected from the injector 85. Further, the intake solenoid valve 192 and the exhaust solenoid valve 193 are driven and controlled to open and close the intake port 52*a* and the exhaust port 52*b* in accordance with the up and down movements of the piston 55. By the intake solenoid valve 192 and the exhaust solenoid valve 193, the intake valve 157 and the exhaust valve 158 can be moved regardless of the rotation timing of the crankshaft 66. The exhaust gas retained at the intake side relative to the exhaust port 52*b* can thereby be delivered efficiently to the exhaust pipe 87 side.

As described above, in the second preferred embodiment, before the starting of the engine 105 is performed, it is checked whether or not the intake valve 157 and the exhaust valve 158 are in the overlap state in which both are stopped at the respective closed positions. If and only if the valves are in the overlap state, a process of driving the starter motor 76 in the state of prohibiting fuel injection is executed to discharge the exhaust gas at the intake side in an initial period of engine starting. If at least one of the intake valve 157 or the exhaust valve 158 closes at least one of the intake port 52*a* or the exhaust port 52*b*, the exhaust gas does not flow in reverse from the exhaust pipe 87 and thus hardly any exhaust gas is retained at the intake side relative to the exhaust port 52*b*. Thus, in this case, an extra operation for delivering air, etc., at the intake side relative to the exhaust port 52*b*, to the exhaust pipe 87 side can be omitted when the starting of the engine 105 is performed.

Other Preferred Embodiments

It is to be understood that the preferred embodiments disclosed herein are by all means illustrative and not restrictive. The scope of the present invention is defined by the claims and not by the preceding description of the preferred embodiments, and all changes that fall within the metes and bounds of the claims or equivalence of such metes and bounds are therefore intended to be embraced by the claims.

For example, with each of the first and second preferred embodiments, although an example where the preferred embodiments of the present invention is applied to a saddle type water jet propulsion watercraft has been described, the present invention is not restricted thereto. For example, the present invention may be applied to a water jet propulsion watercraft other than a saddle type water jet propulsion watercraft, such as to a pleasure boat (sport boat) that includes a seat of a type other than a saddle type.

Also, with each of the first and second preferred embodiments, although an example where the exhaust gas retained in the combustion chamber is delivered to the exhaust pipe side by moving the piston, has been described, the present invention is not restricted thereto. For example, the exhaust gas retained in the combustion chamber may be delivered to the exhaust pipe side by a fan or other mechanism besides that which makes a piston move.

Also, with each of the first and second preferred embodiments, an example where, when the starting of the engine is performed, the starter motor is driven in the state of prohibiting fuel injection when it is determined that the intake valve and the exhaust valve are in the overlap state in which both valves are stopped at the respective open positions, has been described. However, the present invention is not restricted thereto, and the control for delivering the exhaust gas, retained at the intake side relative to the intake port, to the exhaust port side may be performed without determining whether or not the valves are in the overlap state.

Also, with each of the first and second preferred embodiments, an arrangement where, one of the intake port or the exhaust port is closed when it is determined that the intake valve and the exhaust valve are in the overlap state in which both valves are stopped at the respective open positions when the engine is stopped, has been described. However, the present invention is not restricted thereto, and arrangements may be made such that the operation of closing one of the intake port or the exhaust port is not performed when the driving of the engine is stopped.

Also, with the second preferred embodiment, an arrangement where the intake solenoid valve is driven to close the intake port when the engine is stopped, has been described. However, the present invention is not restricted thereto, and arrangements may be made to drive the exhaust solenoid valve to close the exhaust port when the engine is stopped. Or, arrangements may be made to drive both the intake solenoid valve and the exhaust solenoid valve to close both the intake port and the exhaust port.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Japanese Patent Application No. 2009-091771 filed in the Japan Patent Office on Apr. 6, 2009, and the entire disclosure of the application is incorporated herein by reference.

What is claimed is:

1. A water jet propulsion watercraft comprising:

a hull;

an engine installed in the hull, the engine including:

a combustion chamber arranged to combust fuel therein;

an exhaust port arranged to discharge exhaust gas after combustion of the fuel in the combustion chamber;

an exhaust valve arranged to open and close the exhaust port;

an intake port arranged to pass air and the fuel into the combustion chamber; and an intake valve arranged to open and close the intake port; wherein the engine is arranged to operate so as to have an overlap period where the exhaust port and the intake port are opened simultaneously;

a jet propulsion device arranged to be driven by the engine to draw in water from around the hull and then jet the water;

a fuel injection apparatus arranged to inject the fuel into the intake port;

an exhaust channel connected to the exhaust port and arranged to discharge the exhaust gas from the exhaust port;

a detection unit arranged to detect whether or not the intake valve closes the intake port and whether or not the exhaust valve closes the exhaust port; and an engine control unit arranged to control the engine in a state where a fuel injection amount of the fuel injection apparatus is set lower than an ordinary fuel injection amount only during a predetermined period when starting of the engine is performed and the detection unit detects an overlap state in which both the intake valve and the exhaust valve are stopped at positions of respectively opening the intake port and the exhaust port.

2. The water jet propulsion watercraft according to claim 1, wherein the engine further includes a crankshaft arranged to be rotated by the engine, and a piston arranged to move with the rotation of the crankshaft, and the engine control unit is arranged to perform a drive control of causing the piston to move in a state where the fuel injection amount of the fuel injection apparatus is set lower than the ordinary fuel injection amount during the predetermined period when the starting of the engine is performed.

3. The water jet propulsion watercraft according to claim 2, wherein the engine further includes a starter motor arranged to rotate the crankshaft during starting, and the engine control unit is arranged to perform a drive control of making the crankshaft rotate by driving the starter motor in the state where the fuel injection amount of the fuel injection apparatus is set lower than the ordinary fuel injection amount during the predetermined period when the starting of the engine is performed.

4. The water jet propulsion watercraft according to claim 2, wherein the engine further includes:

a first actuator arranged to cause the intake valve to move to an open position of opening the intake port and a closed position of closing the intake port; and a second actuator arranged to cause the exhaust valve to move to an open position of opening the exhaust port and a closed position of closing the exhaust port; wherein when the starting of the engine is performed, the engine control unit is arranged to perform a drive control of the first actuator and the second actuator at predetermined timings regardless of a stroke of the engine such that in the predetermined period, the intake valve is moved to the open position and the exhaust valve is moved to the closed position in a period in which the piston expands the combustion chamber and the intake valve is moved to the closed position and the exhaust valve is moved to the open position in a period in which the piston compresses the combustion chamber.

5. The water jet propulsion watercraft according to claim 4, wherein the first actuator includes a first solenoid valve and the second actuator includes a second solenoid valve.

6. The water jet propulsion watercraft according to claim 4, wherein:

the engine control unit is arranged to perform the drive control of the first actuator and the second actuator at the predetermined timings in the predetermined period when the starting of the engine is performed.

7. The water jet propulsion watercraft according to claim 1, wherein the engine control unit is arranged to drive the engine by setting the fuel injection amount of the fuel injection apparatus to the ordinary injection amount after the elapse of the predetermined period.

8. The water jet propulsion watercraft according to claim 1, wherein the predetermined period includes a period in which the crankshaft of the engine is driven for a predetermined time, or a period in which the crankshaft is rotated a predetermined number of times.

9. The water jet propulsion watercraft according to claim 1, wherein the engine control unit is arranged to control the engine to block at least one location in a path leading from the exhaust channel to the intake port when driving of the engine is stopped.

* * * * *